(12) United States Patent
Kim (10) Patent No.: US 9,393,689 B2
(45) Date of Patent: Jul. 19, 2016

(54) ROBOT CLEANING SYSTEM AND METHOD FOR CHARGING THE SAME

(71) Applicant: LG ELECTRONICS INC., Seoul (KR)

(72) Inventor: Jaewoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/581,036

(22) Filed: Dec. 23, 2014

(65) Prior Publication Data

US 2015/0202772 A1   Jul. 23, 2015

(30) Foreign Application Priority Data

Jan. 17, 2014  (KR) .................. 10-2014-0006235

(51) Int. Cl.
*A47L 11/00* (2006.01)
*B25J 9/16* (2006.01)
*G05D 1/02* (2006.01)
*G01S 5/28* (2006.01)

(52) U.S. Cl.
CPC .... *B25J 9/16* (2013.01); *G01S 5/28* (2013.01); *G05D 1/0225* (2013.01); *G05D 1/0255* (2013.01); *A47L 2201/02* (2013.01); *A47L 2201/022* (2013.01); *A47L 2201/04* (2013.01); *G05D 2201/0215* (2013.01); *Y10S 901/01* (2013.01)

(58) Field of Classification Search
CPC ............ A47L 2201/022; A47L 2201/14; A47L 2201/02; G05D 1/0225; G05D 2201/0215; G05D 1/0255; B25J 9/1694; Y10S 901/01
USPC ............. 700/245, 258, 286; 318/568.12, 587; 701/23, 300; 901/1, 46, 47
See application file for complete search history.

(56) References Cited

U.S. PATENT DOCUMENTS

| 6,764,373 B1* | 7/2004 | Osawa .................. B25J 19/005 180/169 |
| 2011/0202175 A1* | 8/2011 | Romanov ............ A47L 11/4011 700/250 |
| 2012/0116588 A1 | 5/2012 | Lee et al. |
| 2012/0176249 A1* | 7/2012 | Chatterjee ............ G08B 13/149 340/686.6 |

FOREIGN PATENT DOCUMENTS

WO    2007/036487 A2    4/2007

OTHER PUBLICATIONS

Hiromichi Hashizume et al: "Fast and Accurate Positioning Technique Using Ultrasonic Phase Accordance Method", TENCON 2005 2005 IEEE Region 10, IEEE, PI, Nov. 21, 2005, pp. 1-6, XP031015650, DOI: 10.1109/TENCON.2005.301009, ISBN: 978-0-7803-9311-0, pp. 1, 2; figures 4a-4c.

* cited by examiner

*Primary Examiner* — Dalena Tran
(74) *Attorney, Agent, or Firm* — Dentons US LLP (57) ABSTRACT

A robot cleaning system includes a robot cleaner comprising a sensor for receiving a specific signal sound, a rechargeable battery, and a control unit; and a recharging base comprising an audio output device for outputting the specific signal sound. The control unit calculates a distance and a direction from the robot cleaner to the recharging base based on the signal sound received by the sensor, and controls the robot cleaner to move based on the calculated distance and direction, when a remaining amount of the battery is less than a preset value. The robot cleaner docks with the recharging base to recharge the battery of the robot cleaner.

16 Claims, 8 Drawing Sheets

ROBOT CLEANING SYSTEM AND METHOD FOR CHARGING THE SAME

Pursuant to 35 U.S.C. §119(a), this application claims the benefit of earlier filing date and right of priority to Korean Application No. 10-2014-0006235, filed on Jan. 17, 2014, the contents of which are hereby incorporated by reference herein in their entirety.

BACKGROUND

1. Field

Embodiments of the present disclosure relate to a robot cleaning system and a method for charging the same, and more particularly, to a robot cleaning system which may allow a robot cleaner to dock with a recharging base rapidly to recharge the robot cleaner, and a method for recharging the same.

2. Discussion of the Related Art

Typically, a robot cleaner vacuums foreign substances including dust and other debris from a floor, while autonomously driving through a cleaning section.

The robot cleaner may perform cleaning (along a cleaning path) preset in accordance with an internal stored program or an automatic drive. To perform cleaning while driving along the path automatically, numerous sensors are used to sense a location of the robot cleaner, the distance traveled of the robot cleaner, and obstacles.

Meanwhile, a battery is provided in a robot cleaner to drive the robot cleaner wirelessly. When the battery is nearing depletion, recharging needs and various methods for performing such recharging have been provided.

A recharging base using an IR (Infrared) beam has a disadvantage of being affected by obstacles placed in front of the beam. Specifically, in the method using IR, a sensor provided in a robot cleaner senses the light generated in the recharging base and finds the recharging base along the light. However, when there is an obstacle in front of the recharging base, the light fails to be sensed by the robot cleaner because of the light beam's directionality. When there is an obstacle in front of the recharging base, it is difficult to search the location of the recharging base.

Meanwhile, in a method for searching a recharging base through a map using SLAM (Simultaneous Localization and Mapping), the recharging base cannot be searched after a failure to configure SLAM. Additionally, it takes significant time to configure the map and it is less efficient dealing with frequent changes of furniture arrangement and locations of obstacles.

SUMMARY

Embodiments of the present disclosure are directed to solve such disadvantages of a conventional robot cleaning cycle and a method for recharging the same mentioned above.

Embodiments of the present disclosure provide a robot cleaning system having a robot cleaner which may search a location and direction of a recharging base rapidly.

Embodiments of the present disclosure provide a robot cleaning system having a robot cleaner which may search a recharging base, regardless of obstacles.

Embodiments of the present disclosure provide a robot cleaning system which may search a location and a direction of a recharging base, without researching an internal structure of a house or location of furniture, to dock with the recharging base.

To achieve these objects and other advantages and in accordance with the purpose of the disclosure, as embodied and broadly described herein, a robot cleaning system includes a robot cleaner comprising a sensor for receiving a specific signal sound, a rechargeable battery, and a control unit. The system further includes a recharging base comprising an audio output device for outputting the specific signal sound. the control unit calculates a distance and a direction from the robot cleaner to the recharging base based on the signal sound received by the sensor, and controls the robot cleaner to move based on the calculated distance and direction, when a remaining amount of the battery is less than a preset value, and wherein the robot cleaner docks with the recharging base to recharge the battery of the robot cleaner The robot cleaner may further include a first communication unit for communicating with the recharging base, wherein the first communication unit transmits a specific sound generation requesting signal to the recharging base, when the remaining amount of the battery is below the preset value, and the audio output device of the recharging base outputs a specific signal sound, when a second communication unit of the recharging base receives the signal.

The control unit may turns on the sensor when the remaining amount of the battery falls below the preset value.

The sensor may be a microphone for receiving the signal sound. At least three microphones may be provided. The audio output device of the recharging base outputs a specific signal sound, when a second communication unit of the recharging base receives the signal. The microphone may be provided in a front surface portion or an upper end portion of the robot cleaner. The audio output device may be provided in a front surface of the recharging base. The signal sound may be an inaudible sound. The signal sound may be generated in a preset time period and at preset intervals.

Embodiments of the present disclosure also provide a method for recharging a robot cleaner including checking a remaining amount of a battery in the robot cleaner; sensing a specific signal sound generated from a recharging base, when the remaining amount of the battery is below a preset value; calculating a direction and a distance from the robot cleaner to the recharging base, based on the received specific signal sound; controlling the robot cleaner to drive based on the calculated direction and distance and to dock with the recharging base; and controlling the recharging base to recharge the battery of the robot cleaner.

The step of sensing the specific signal sound may include controlling a first communication unit of the robot cleaner to request the recharging base to generate the specific signal sound, when a remaining amount of the battery is below the preset value; and controlling the specific signal sound to be output when the recharging base receives the request.

The step of sensing the specific signal sound may further include activating the sensor when the remaining amount of the battery is below the preset value.

The effects of the wireless sound equipment according to the embodiments of the disclosure will be as follows.

Embodiments of the present disclosure provide a robot cleaning system having a robot cleaner which may search a location and direction of a recharging base rapidly.

Embodiments of the present disclosure provide a robot cleaning system having a robot cleaner which may search a recharging base, regardless of obstacles.

Embodiments of the present disclosure provide a robot cleaning system which may search a location and a direction of a recharging base, without researching an internal structure of a house or furniture locations, to dock with the recharging base.

It is to be understood that both the foregoing general description and the following detailed description are exemplary and explanatory and are intended to provide further explanation of the disclosed subject matter as claimed.

DETAILED DESCRIPTION OF EMBODIMENTS

Exemplary embodiments of the disclosed subject matter are described more fully hereinafter with reference to the accompanying drawings. The disclosed subject matter may, however, be embodied in many different forms and should not be construed as limited to the exemplary embodiments set forth herein. In the drawings, the size and relative sizes of layers and regions may be exaggerated for clarity. Like reference numerals in the drawings denote like elements. The terminology used herein is for the purpose of describing exemplary embodiments only and is not intended to be limiting of the disclosed subject matter. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the disclosed subject matter will be described in detail with reference to the accompanying drawings.

Figure 1:
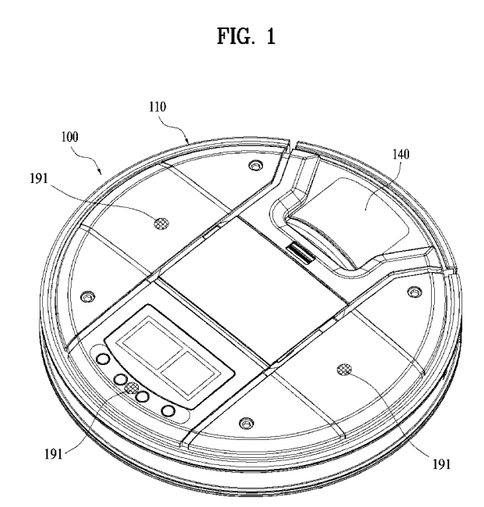
FIG. 1 is a perspective diagram of a robot cleaner provided in a robot cleaning system according to embodiments of the present disclosure.
Figure 2:
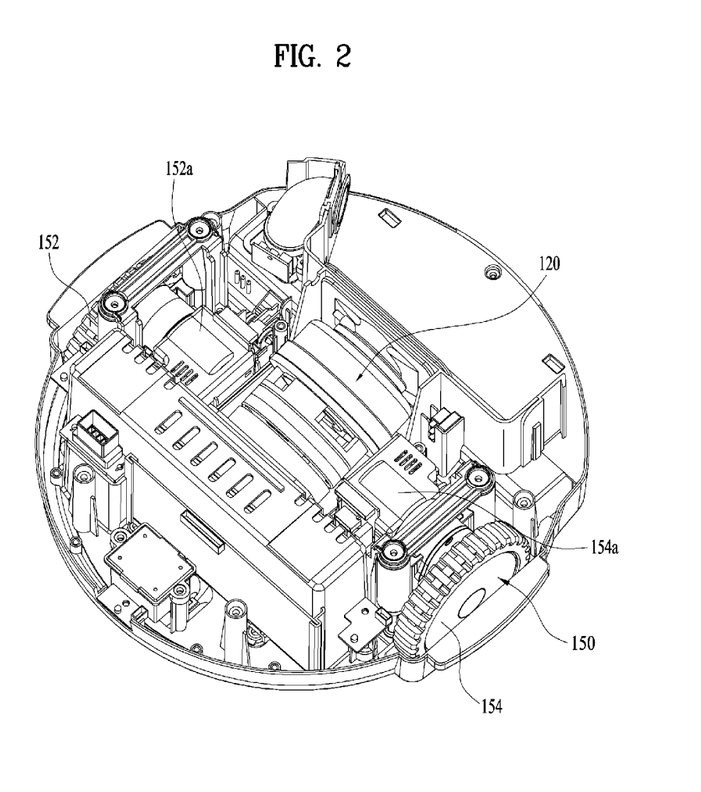
FIG. 2 is a perspective diagram illustrating an internal structure of a robot cleaner provided in a robot cleaning system according to embodiments of the present disclosure.
Figure 3:
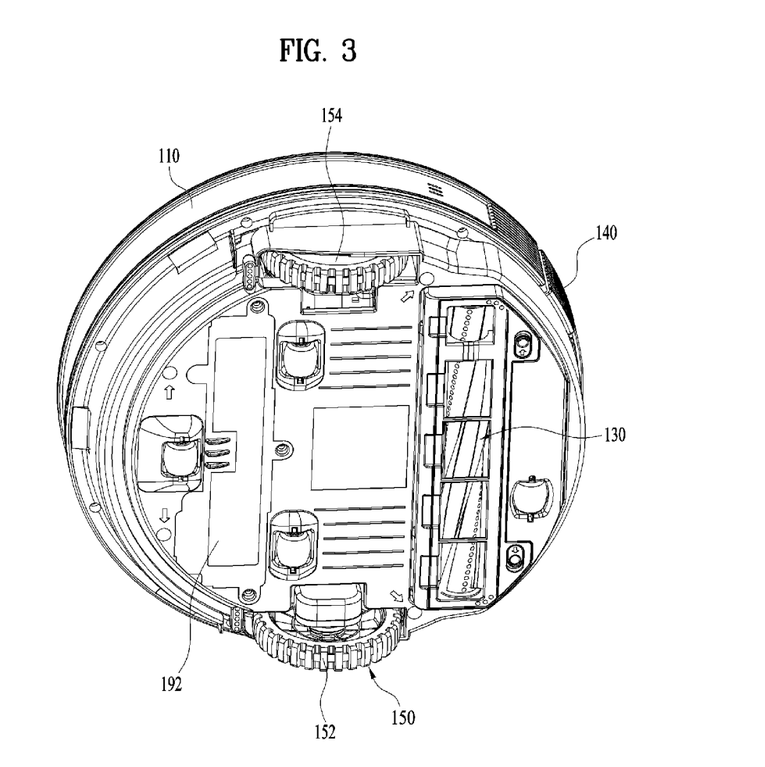
FIG. 3 is a lower perspective diagram of a robot cleaner provided in a robot cleaning system according to embodiments of the present disclosure.

Referring to FIGS. 1 through 3, a basic structure of a robot cleaner 100 provided in a robot cleaning system according to one embodiment of the present disclosure will be described.

FIG. 1 is a perspective diagram of a robot cleaner provided in a robot cleaning system according to embodiments of the present disclosure. FIG. 2 is a perspective diagram illustrating an internal structure of a robot cleaner provided in a robot cleaning system according to embodiments of the present disclosure. FIG. 3 is a lower perspective diagram of a robot cleaner provided in a robot cleaning system according to embodiments of the present disclosure.

A case 110 provided in the robot cleaner defines an exterior appearance of the robot cleaner 100 and the case 110 is formed in a cylindrical shape having a height relatively lower than a diameter, in other words, a flat cylindrical shape.

The case 110 may be provided a suction mechanism 120, a suction nozzle 130, and a dust collection unit 140 in communication with the suction nozzle 130.

Meanwhile, in an outer circumferential surface of the case 110 may be a damper (not shown) for dampening a shock generated by collision with a sensor 190 for sensing a distance between the robot cleaner and a wall or an obstacle indoor. Right and left driving wheels 152 and 154 may be provided in both lower portions of the robot cleaner 110 to move the robot cleaner 100, respectively.

The right and left wheels 154 and 152 are configured to be rotated by a right wheel motor 154a and a left wheel motor 152a controlled by a case control unit 180, respectively. The robot cleaner 100 performs cleaning for a room, while automatically changing direction in accordance with driving of the right and left wheel motors 154a and 152a.

When describing an internal structure of the robot cleaner 100 more specifically, a cleaner control unit 180 is provided in a front portion of the case 110 and diverse electric control parts for controlling the driving of the robot cleaner 100 are arranged in the cleaner control unit 180.

The suction nozzle 130 is provided under the dust collection unit and it vacuums foreign substances from the floor, together with air.

The suction mechanism 120 is inclinedly provided between the battery (not shown) and the dust collection unit 140. The suction mechanism 120 includes a motor (not shown) electrically connected with the battery and a fan (not shown) connected to a shaft of the motor to forcibly blow air.

Meanwhile, the suction nozzle 130 is exposed through a bottom of the robot cleaner 100 via a hole formed in a lower surface of the case 110, only to contact with the floor of the room.

An audio sensor 190 is provided in the robot cleaner to receive a specific signal sound emitted from the recharging base 200. The recharging base is configured to recharge the battery of the robot cleaner, which will be described in detail later. The signal sound may be an inaudible sound in a predetermined frequency band which cannot be heard through human ears.

Since the signal sound cannot be heard in daily living and there may not cause noises. It is preferred that only the audio sensor 190 of the robot cleaner may sense the signal sound.

In this embodiment of the present disclosure, the control unit may inactivate the audio sensor 190, when a remaining amount of the battery is a preset value or more, and activate the sensor 190, when the remaining amount of the battery is a preset value or less.

Accordingly, the energy consumed by the operation of the sensor 190, when the remaining amount of the battery is sufficient, may be reduced.

In the embodiment of the present disclosure, the sensor 190 may include a microphone 191 for receiving the signal sound. It is preferred that at least three microphones 191 may be provided. Using three audio sensors 190, a direction of a sound source may be localized through signal translation.

For instance, a time difference of arrival of each pair of the audio sensors 190 may be localized based on electric signals output from each of the three audio sensors 190 by one sound source. A direction of a sound source may be detected, using a time difference of the sound source sensed by each microphone 191.

When transmitting a specific signal sound with a uniform sound pressure (dB) from the recharging base, a sound input in accordance with a distance between the recharging base and the robot cleaner is differentiated. The difference of the sound pressures is analyzed to calculate the distance from the robot cleaner to the recharging base. For instance, as the distance from a sound source increases, the received sound pressure decreases, which is tabalized to be searched and used by the control unit.

Meanwhile, the microphone 191 may be provided in a front portion or an upper end portion of the robot cleaner, to best receive the sound transmitted from the recharging base.

The control unit 180 of the robot cleaner may calculate the distance and the direction from the robot cleaner to the recharging base based on the sound received by the microphone 191.

The control unit may stop cleaning, when a remaining amount of the battery is at or below a preset value and then it may move the robot cleaner based on the distance and the direction to the recharging base calculated from the receiving sound.

In FIG. 3, a reference numeral 192 refers to a battery cover. The user could couple or decouple a battery to the case 110.

Hereinafter, referring to FIG. 4, a basic structure of the recharging base 200 provided in the robot cleaning system according to one embodiment of the present disclosure will be described.

Figure 4:
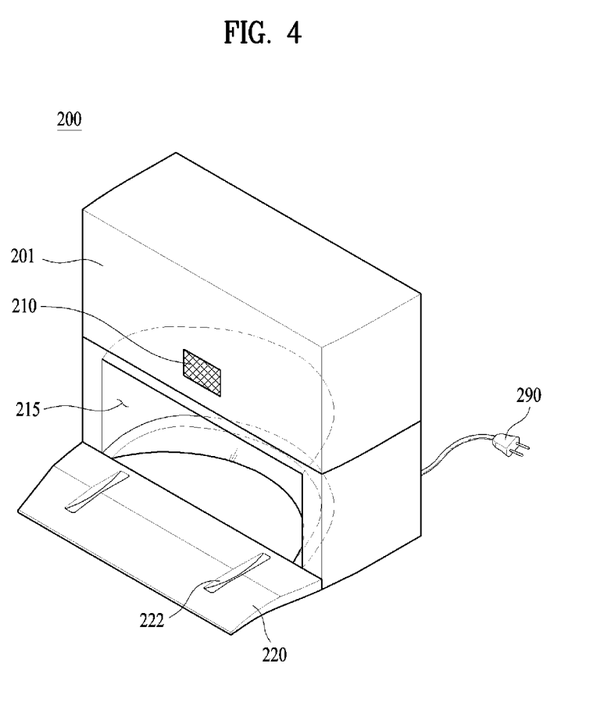
FIG. 4 is a perspective diagram of a recharging base provided in a robot cleaning system according to embodiments of the present disclosure.

FIG. 4 is a perspective of the recharging base according to an embodiment of the present disclosure.

The recharging base 200 may include a recharging base case 201 having a holding portion 215 for holding the robot cleaner 100, a control unit (not shown) for controlling an operational state of the recharging base 200, a guide plate 220 for guiding the robot cleaner 100 to the holding portion 215, a recharging terminal for recharging the battery of the robot cleaner 100, and a second communication unit (240) having a wireless communication function. Additionally, the recharging base 200 may further include an audio output device 210 for outputting the specific signal sound.

The recharging base case 201 has a shape corresponding to the exterior appearance of the robot cleaner 100 which includes the holding portion 215 for coupling the robot cleaner 100 to the recharging base 200. Generally, corresponding to the flat cylindrical shape of the robot cleaner 100, the holding portion 215 has a recessed shape with a preset curvature.

The control unit of the recharging base is provided in the recharging base case and electric control parts for controlling the driving of the recharging base 200 are arranged in the recharging base case. In this instance, control signals of the recharging base 200 and the robot cleaner 100 are exchanged by a second communication unit 240 and first communication means 170 which will be described later, such that the driving of the recharging base 200 can be controlled by the robot cleaner control unit 180, without an auxiliary control unit of the recharging base 200.

However, in the robot cleaning system according to one embodiment of the present disclosure, the recharging base 200 includes a recharging base control unit 250.

The guide plate 220 is provided under the holding portion 215, being projected to a front portion of the recharging base 200. An inclined surface with a preset slope is formed in the guide plate to guide the robot cleaner 100 to enter into the holding portion 215 smoothly and easily.

Moreover, the guide plate may include a supporting portion 222 for supporting the right and left driving wheels 154 and 152 not to move in the holding portion 215 while the robot cleaner 100 is held in the holding portion 215. The supporting portion 222 is a recess recessed in an inner portion of the guide plate 220 and it has a corresponding shape to the shape of the right and left driving wheels 154 and 152 of the robot cleaner 100.

The recess having the shape corresponding to the shape of the right and left driving wheels 154 and 152 of the robot cleaner 100 may prevent the wheels 154 and 152 of the robot cleaner 100 from falling down while the robot cleaner 100 is seated on the recharging base 200. Accordingly, an electric power is supplied to the right and left driving wheels 154 and 152 of the robot cleaner 100 continuously for stable coupling, such that no additional force needs to be supplied along the direction in which the robot cleaner 100 is coupled to the recharging base 200.

The connector unit 290 is provided in a rear surface of the recharging base case 201 and it supplies electric power to the recharging base 200. The connector unit 290 is insertedly kept in the recharging base 200 and the length of the connector unit 290 is adjustable, such that it can be drawn into the recharging base 200 by the user if necessary.

Meanwhile, the recharging base 200 may perform a function as a recharging device of the robot cleaner 100. To perform the recharging function, the recharging terminal is further provided in the recharging base 200. The recharging terminal is provided in a predetermined portion of the recharging base case 201 to recharge the battery of the robot cleaner 100 and it has a corresponding shape to a shape of the socket provided in a predetermined portion of the robot cleaner 100.

To recharge the battery of the robot cleaner 100, the rear surface of the robot cleaner 100 has to be inserted in the holding portion 215. Once the insertion in the holding portion 215 is completed, the recharging terminal may contact with the recharging socket simultaneously. The battery of the robot cleaner 100 is then recharged by the recharging base 200.

The audio output device 210 is provided in the front portion of the recharging base to output a specific signal sound which can be sensed by the microphone 191 of the robot cleaner 100.

The signal sound may be generated in a preset time period and at intervals. The audio output device 210 may continuously output the signal sound in an activated state and also generate the specific signal sound only when receiving the signal transmitted from the robot cleaner.

In other words, the control unit of the robot cleaner 100 may transmit a signal for asking the audio output device 210 to output the specific signal sound through the first communication unit and the second communication unit, when the remaining amount of the battery is at or below a preset value.

Accordingly, the recharging base 200 may output the signal sound only when the remaining amount of the battery is insufficient, only to prevent an unnecessary operation of the sensor 190 and to reduce power consumption.

Figure 5:
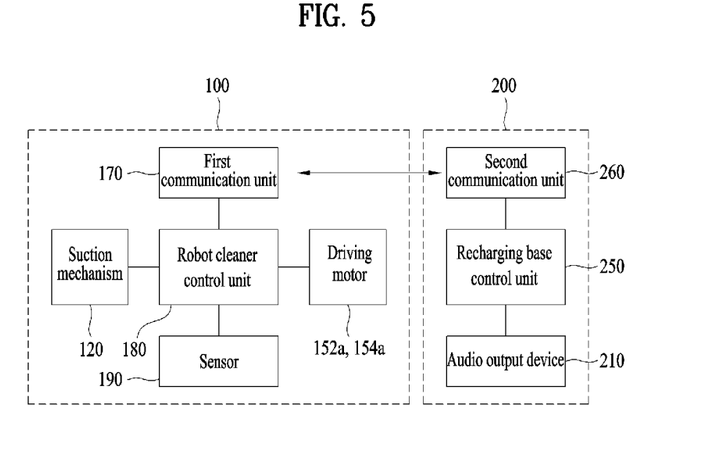
FIG. 5 is a block diagram illustrating a control system of a robot cleaning system according to embodiments of the present disclosure.

FIG. 5 is a block diagram illustrating a control system of a robot cleaning system according to embodiments of the present disclosure. Hereinafter, referring to FIG. 5, the transmission of control signals between the robot cleaner and the recharging base will be described.

The robot cleaner 100 includes the control unit 180 for controlling an operational state of the robot cleaner 100 and the first communication unit 170 connected to the control unit 180, with a wireless communication function.

To perform a basic cleaning function, the robot cleaner 100 further includes the suction mechanism 120 and the driving motor 152a and 154a. The robot cleaner 100 further includes the audio sensor 190 provided in the recharging base to sense a specific signal transmitted from the recharging base.

The recharging base 200 shown in FIG. 5 includes a recharging base control unit 250 for controlling an operational state thereof and the audio output device 210 for outputting a specific receiving sound sensible by the robot cleaner. The recharging base 200 may further include the second communication unit 260 connected with the recharging base control unit 250, with a wireless communication function.

The robot cleaner 100 and the recharging base 200 requests a specific signal sound and transmits a command signal, in accordance with a remaining amount of the battery provided in the robot cleaner through the first communication unit 170 and the second communication unit 260.

The first communication unit 170 transmits a specific sound generation requesting signal to the recharging base 200, when the remaining amount of the battery is at or below a preset value. Once the communication unit of the recharging base receives the signal, the audio output device 210 outputs the specific signal sound.

So far, the robot cleaning system according to the embodiment of the present disclosure is described. Hereinafter, a method for recharging a robot cleaner according to one embodiment of the present disclosure will be described, referring to FIGS. 6 through 8.

Figure 6:
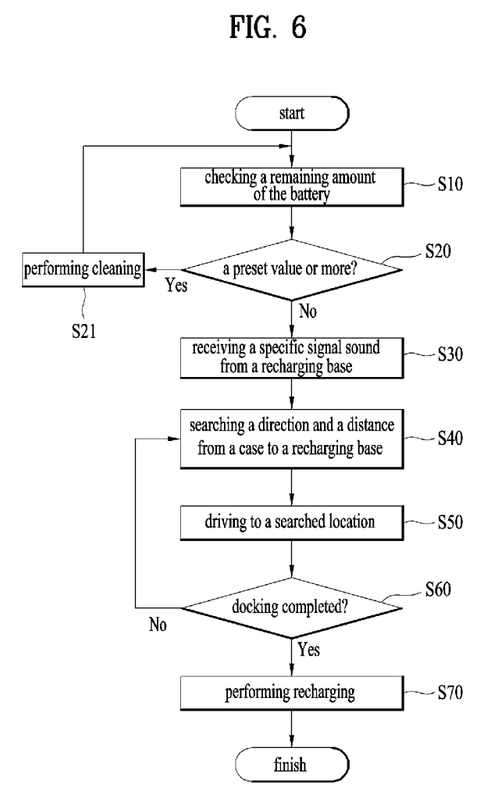
FIGS. 6, 7, and 8 are flow charts illustrating a method for recharging a robot cleaning system according to embodiments of the present disclosure.
Figure 7:
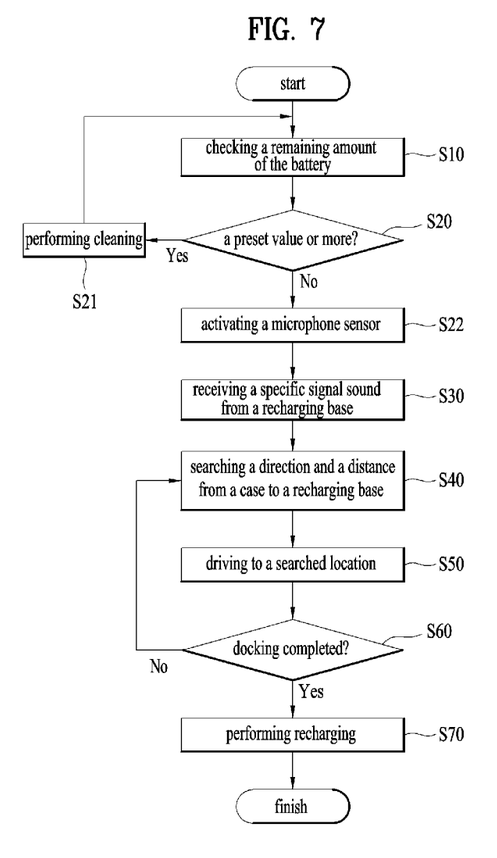
Figure 8:
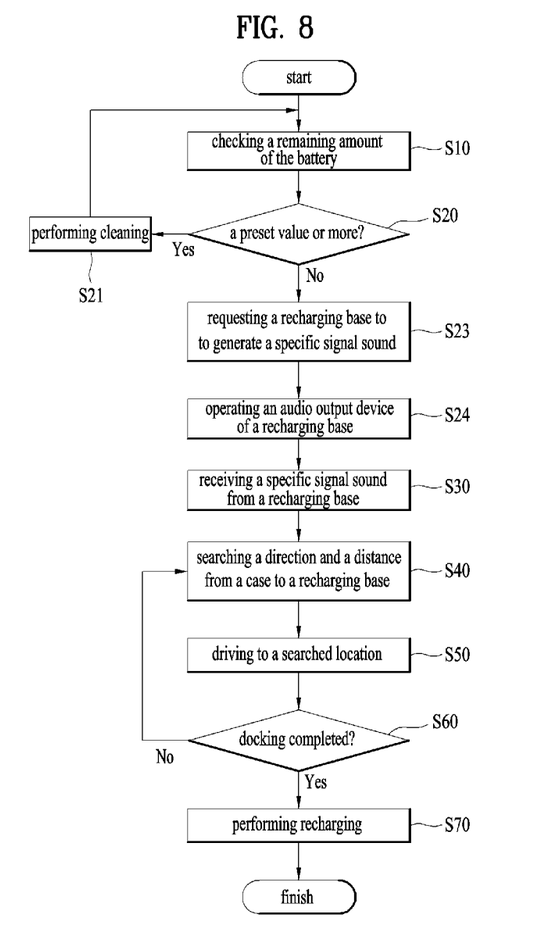

FIGS. 6, 7, and 8 are flow charts illustrating a method for recharging a robot cleaning system according to embodiments of the present disclosure.

Referring to FIG. 6, the method for recharging the robot cleaner 100 includes a step of the control unit checking whether a remaining amount of the battery is at or above a preset value (S10). When the remaining amount of the battery is at or above the preset value, the cleaning is performed continuously (S21). When the remaining amount of the battery is below a preset value, the sensor of the robot cleaner senses a specific signal sound generated from the recharging base (S30). The control unit may calculate a direction and a distance from the robot cleaner to the recharging base based on the received specific signal (S40). The method for recharging the robot cleaner may include a step of the robot cleaner driving based on the calculated direction and distance (S50).

The control unit checks whether the robot cleaner is docked with the recharging base (S60). Once the docking is completed, the battery is recharged (S70). If the docking is not performed properly, the location of the recharging base is searched again.

When the remaining amount of the battery is 20% or less of the maximum rechargeable amount of the battery, the robot cleaner is docked with the recharging base. The minimum of the remaining battery amount which triggers docking can be adjusted.

Referring to FIG. 7, another embodiment of the present disclosure will be described. When the control unit determines that the remaining amount of the battery is below a preset value in the robot cleaner (S20), the control unit may activate the microphone sensor of the robot cleaner (S22).

In other words, only after checking that the remaining amount of the battery is insufficient, the control unit operates the microphone sensor.

Referring to FIG. 8, one embodiment is shown that the audio output device of the recharging base is operated only when the remaining amount of the battery provided in the robot cleaner is insufficient.

Once the control unit checks that the remaining amount of the recharging battery is below the preset value (S20), a step of requesting the recharging base to output the specific signal sound through the first communication unit is performed.

The recharging base receiving the command signal operates the audio output device (S24) and outputs the specific signal.

Although embodiments have been described with reference to a number of illustrative embodiments thereof, it should be understood that numerous other modifications and embodiments can be devised by those skilled in the art that will fall within the spirit and scope of the principles of this disclosure.

What is claimed is:

1. A robot cleaning system comprising:
a robot cleaner comprising:
   a case;
   a suction nozzle formed in a lower surface of the case;
   a dust collection unit provided in the case in communication with the suction nozzle;
   a sensor for receiving a specific signal sound,
   a rechargeable battery, and
   a control unit; and
a recharging base comprising:
   an audio output device for outputting the specific signal sound,
wherein the control unit calculates a distance and a direction from the robot cleaner to the recharging base based on the signal sound received by the sensor, and controls the robot cleaner to move based on the calculated distance and direction, when a remaining amount of the battery is less than a preset value,
wherein the robot cleaner docks with the recharging base to recharge the battery of the robot cleaner, and
wherein the control unit turns on the sensor when the remaining amount of the battery falls below the preset value.

2. The robot cleaning system of claim 1, wherein the robot cleaner further comprises:
a first communication unit for communicating with the recharging base,
wherein the first communication unit transmits a specific sound generation requesting signal to the recharging base, when the remaining amount of the battery is below the preset value, and
the audio output device of the recharging base outputs a specific signal sound, when a second communication unit of the recharging base receives the signal.

3. The robot cleaning system of claim 1, wherein the sensor is a microphone for receiving the signal sound.

4. The robot cleaning system of claim 3, wherein at least three microphones are provided.

5. The robot cleaning system of claim 4, wherein delay differences in signals of the at least three microphones are triangulated to determine a location of the recharging base.

6. The robot cleaning system of claim 3, wherein the microphone is provided in a front surface portion or an upper end portion of the robot cleaner.

7. The robot cleaning system of claim 1, wherein the audio output device is provided in a front surface of the recharging base.

8. The robot cleaning system of claim 1, wherein the signal sound is an inaudible sound.

9. The robot cleaning system of claim 1, wherein the signal sound is generated in a preset time period and at preset intervals.

10. A method for recharging a robot cleaner comprising a case, a suction nozzle formed in a lower surface of the case, and a dust collection unit provided in the case in communication with the suction nozzle, the method comprising:

checking, by a control unit of a robot cleaner, a remaining amount of a battery in the robot cleaner;

activating, by the control unit of the robot cleaner, a sensor when the remaining amount of the battery is below the preset value;

sensing, by the sensor of the robot cleaner, a specific signal sound generated by an audio output device of a recharging base;

calculating, by the control unit, a direction and a distance from the robot cleaner to the recharging base, based on the received specific signal sound;

controlling, by the robot cleaner control unit, the robot cleaner to drive based on the calculated direction and distance and to dock with the recharging base; and controlling, by a control unit of the recharging base, the recharging base to recharge the battery of the robot cleaner.

11. The method of claim 10, wherein the step of sensing the specific signal sound comprises, controlling, by the robot cleaner control unit, a first communication unit of the robot cleaner to request the recharging base to generate the specific signal sound, when a remaining amount of the battery is below the preset value; and controlling, by the recharging base control unit, the specific signal sound to be output, when the recharging base receives the request.

12. The method of claim 10, wherein the sensor is a microphone for receiving the signal sound.

13. The method of claim 12, wherein at least three microphones are provided.

14. The robot cleaning system of claim 13, wherein delay differences in signals of the at least three microphones are triangulated to determine a location of the recharging base.

15. The method of claim 12, wherein the signal sound is an inaudible sound.

16. The method of claim 10, wherein the signal sound is generated in a preset time period and at preset intervals.

* * * * *